US009794443B2

United States Patent
Su et al.

(10) Patent No.: US 9,794,443 B2
(45) Date of Patent: Oct. 17, 2017

(54) PROXIMITY-BASED USER INTERFACE SYSTEM AND METHOD FOR MULTIFUNCTION DEVICES

(71) Applicants: Kabushiki Kaisha Toshiba, Minato-ku (JP); Toshiba TEC Kabushiki Kaisha, Shinagawa-ku (JP)

(72) Inventors: William Su, Riverside, CA (US); Jenny Zhang, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/010,144

(22) Filed: Jan. 29, 2016

(65) Prior Publication Data

US 2017/0223218 A1   Aug. 3, 2017

(51) Int. Cl.
*H04N 1/32* (2006.01)
*H04N 1/00* (2006.01)

(52) U.S. Cl.
CPC ..... *H04N 1/32101* (2013.01); *H04N 1/00127* (2013.01); *H04N 1/00506* (2013.01); *H04N 2201/0094* (2013.01)

(58) Field of Classification Search
USPC ........................................ 358/1.15
See application file for complete search history.

(56) References Cited

U.S. PATENT DOCUMENTS

| | | | | |
|---|---|---|---|---|
| 2009/0284790 | A1* | 11/2009 | Ohashi | G06F 21/35 358/1.15 |
| 2011/0261389 | A1* | 10/2011 | Ohara | H04M 11/066 358/1.15 |
| 2013/0329253 | A1* | 12/2013 | Sasaki | H04N 1/0035 358/1.15 |

* cited by examiner

*Primary Examiner* — Ngon Nguyen
(74) *Attorney, Agent, or Firm* — Ulmer & Berne LLP

(57) ABSTRACT

A document processing system and method includes a display, and an embedded controller that includes a BLUETOOTH low energy network interface that is configured for communications with mobile computing devices. When a mobile computing device of a user approaches to within a threshold distance of the document processing system, the user can be presented with directions to the document processing system or service related information about the document processing system. With the mobile computing device is within close proximity of the document processing system, the embedded controller sends the user interface of the document processing system to the mobile computing device for display to the user. The distance between the mobile computing device and the document processing system can be approximated using the received signal strength indicator (RSSI) of BLUETOOTH low energy communications received from the mobile computing device by the document processing system.

18 Claims, 4 Drawing Sheets

PROXIMITY-BASED USER INTERFACE SYSTEM AND METHOD FOR MULTIFUNCTION DEVICES

TECHNICAL FIELD

The subject application teaches embodiments that relate generally to transferring the user interface of a multifunction printer to a user computing device, and specifically to selectively displaying a user interface of a multifunction printer on a user's mobile computing device or the location of a multifunction printer based on a user's distance from the multifunction printer.

SUMMARY

In an example embodiment, a document processing system includes an embedded controller and a display in communication with the embedded controller that is configured to receive user interface data from the embedded controller. The embedded controller includes a network interface for data communication with user computing devices, such as mobile computing devices such as smartphones, smart watches, and heads up display devices. The embedded controller is configured to determine when a user computing device is in proximity to the document processing system and, based on the proximity, selectively send the user interface data to the user computing device via the network interface. The embedded controller can be further configured to broadcast, or transmit, a UUID via the network interface, using for example the BLUETOOTH lower energy protocol, and receive a response from a nearby user computing device. The RSSI of the response from the user computing device can be determined and used to approximate the distance to the user computing device. When the distance between the user computing device and document processing system increases, the embedded controller ceases to send the user interface data to the user computing device and control returns to the front panel display of the document process system. When the user computing device first approaches the document processing system and is within a threshold distance, direction information to the document processing system is provided to the user via the user computing device. As the user computing device continues to approach the document processing system, service information about the document processing system is optionally provided to the user computing device. For example, the user can be presented with operational information and provided with an option to select the default language. The user computing device can present a customized version of the user interface without affecting the operation of the front panel display of the document processing system.

In an example embodiment, a method includes determining if a mobile computing device is in proximity to a document processing device, and selectively sending the user interface of the document processing system to the mobile computing device based on the proximity to the document processing system. The mobile computing device can be a mobile phone, a smart phone, a pad computing device, a heads up display device, a glasses based computing device, and a smart watch. The method can include transmitting, or broadcasting, a UUID using the BLUETOOTH low energy interface of the document processing device, receiving a response from a mobile computing device, determining the RSSI of the received response, and approximating the distance between the mobile computing device and the document processing device based at least in part on the RSSI. The method can include determining an increase in distance to the mobile computing device and ceasing sending the user interface to the mobile computing device. The method can include determining that the mobile computing device is within a threshold distance of the document processing device and sending one or more of directional information to the document processing system and service related information about the document processing system. The method can include receiving a user selection of a language and displaying the user interface on the mobile computing device, while not altering the language used on the front panel display of the document processing device. The method can include presenting a customized user interface to the user on the mobile computing device, while not altering the user interface displayed on the front panel display of the document processing device.

In an example embodiment, a document processing system includes a printer configured to print user documents, a networking interface configured to send and receive BLUETOOTH low energy communications with one or more user mobile computing devices and determine the RSSI of received BLUETOOTH low energy communications. The system further includes a front panel display configured to display the user interface, and a process configured to selectively send the user interface to either the front panel display or a mobile computing device. The processor can be further configured to send directional information to service related information to the mobile computing device if the mobile computing device is within a threshold distance of the document processing system, which can be determined based on the RSSI strength of the BLUETOOTH low energy communications.

BACKGROUND

Document processing devices are in widespread use in many businesses and academic settings. Such devices include copiers, scanners, printers and facsimile machines. Today, one or more functions associated with such devices are combined in a single unit, referred to as a multifunction peripheral ("MFP") or multifunction device ("MFD"). MFPs are typically connected to a network to allow users to print remotely from their computers, scan documents that can be sent to a user's computer or a third party's computer (for example via email), copy documents, or fax documents to other people.

Users can control the operations of the MFP via a user interface that is displayed on a display of the MFP. In some instances, it is possible for other people nearby to directly observe the actions of the user at the MFP, for example by looking over the user's shoulder and observing the display and user interface of the MFP. In more sophisticated situations, it is possible for other people to use binoculars, cameras, or mobile computing devices to observe the user at the MFP. Unauthorized parties therefore may be able to observe the user and obtain information such as passwords used by the user at the MFP and sensitive information relating to a user's document. To avoid unwarranted surveillance, a user can shield the keypad, or another part of the display, by using their body to block another person's view, for example by cupping the user's hand over the keypad. However, this conspicuous behavior often draws the attention of other people and may not reliably prevent other people from observing the user's actions.

The disclosed proximity-based user interface system addresses these and other problems associated with displaying information on the display of a MFP.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe a proximity-based user interface system for a document processing device. Suitable document processing devices include scanners, copiers, printers, plotters and fax machines. Two or more of these functions can be contained in a single device or unit, referred to as a multifunction peripheral (MFP) or multifunction device (MFD), which may also serve as an e-mail or other information routing gateway. As used herein, MFP includes any device having one or more document processing functions such as those noted above. While example embodiments described herein refer to MFPs, it will be appreciated that they also may be applied to single use devices, such as a printer.

The disclosed proximity-based user interface system can dynamically transfer the user interface from the MFP front panel display to a user computing device when the user is in close proximity to the MFP. Based on the proximity of the user to the MFP, the proximity-based user interface system optionally can provide additional resource information about the MFP to the user, or show a map to help the user find the location of the MFP.

Advantageously, a proximity-based user interface system can, in some situations, better accommodate the visual needs of the user. A user may have difficulty reading text on an MFP due a small display or small font. Displaying the user interface on the user's computing device can assist a visually challenged user in operating the MFP. The user's computing device can be tailored to meet the user's own visual requirements, for example by providing a larger screen than the MFP, by allowing the user to use a high contrast font, or by presenting information on a display that is closer to the user's eyes.

Figure 1:
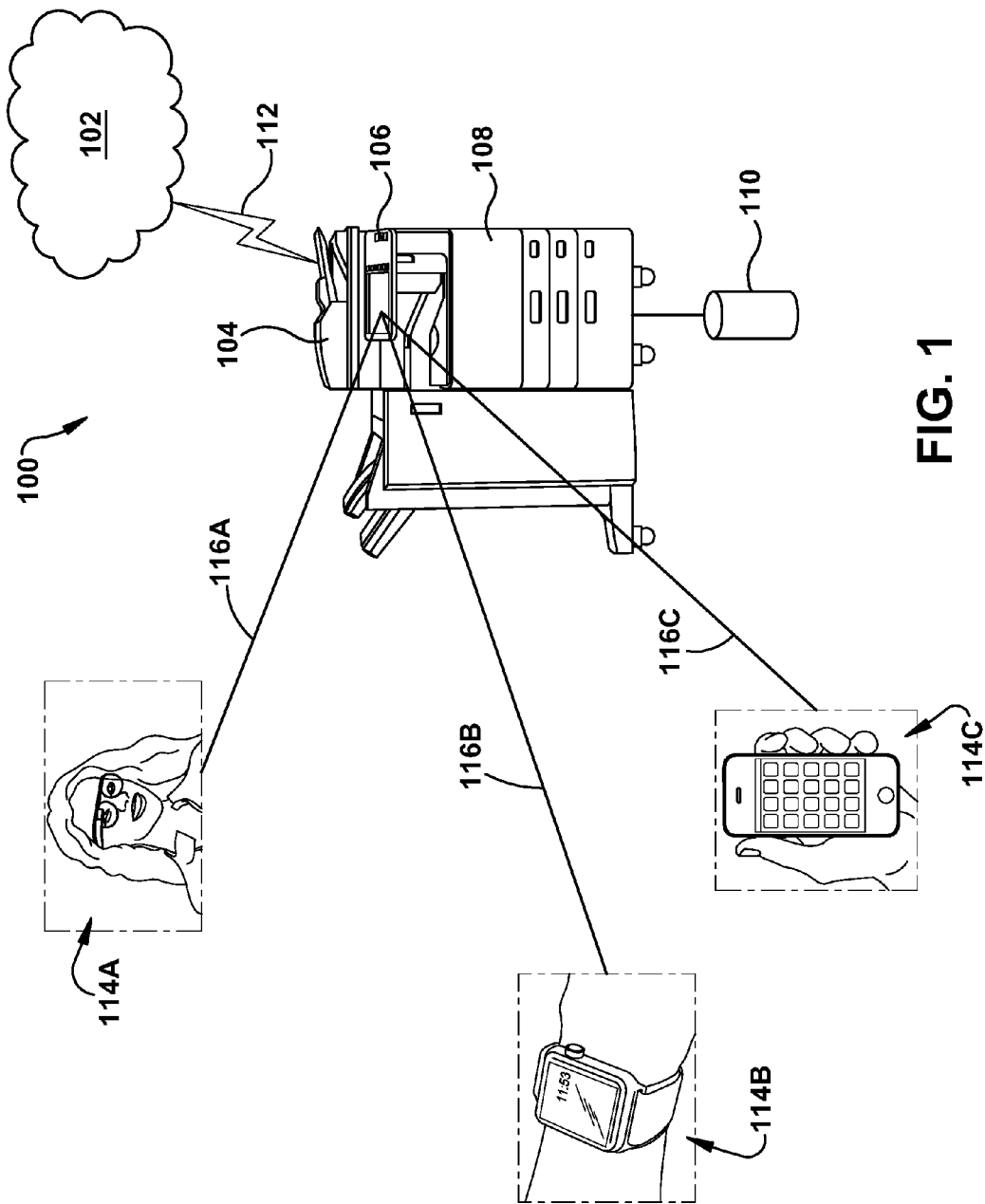
FIG. 1 is a diagram of a proximity-based user interface system included in a multifunction peripheral according to an embodiment of the disclosure.

Turning to FIG. 1, a document processing system 100 with a proximity-based user interface is presented. The document processing system 100 includes a network 102 that is in data communication with one or more document processing devices, suitably comprised of an MFP 104 as illustrated. MFP 104 is suitably operable for printing, faxing, scanning, copying, e-mailing, or any other document processing operation will be understood by one of ordinary skill in the art. In the illustrated embodiment, MFP 104 includes a user interface 106 that can include a display screen. Operation of the MFP 104 is suitably managed by an embedded controller 108 and embedded data storage 110.

In the example embodiment of FIG. 1, MFP 104 is coupled for data communication 112 with network 102, suitably comprised of a local area network (LAN), a remote local area network (RLAN), a wide area network (WAN) which may comprise the Internet, or any combination thereof.

MFP 104 also is coupled for short range data communication 116A, 116B, 116C (collectively short range data communication 116) with user computing devices 114 such as a heads up display 114A such as the GOOGLE GLASS, a smart watch 114B such as the APPLE IWATCH, or smart phone 114C such as the APPLE IPHONE. Any suitable user computing device can be used, including but not limited to wearable or portable computing devices.

BLUETOOTH LE, also known as BLUETOOTH low energy, includes proximity sensing capabilities. By monitoring the received signal strength indication, or RSSI, a BLUETOOTH LE capable device can determine the approximate distance to, or the proximity of, another BLUETOOTH LE capable device. In an embodiment, the short range data communication protocol used between the MFP 104 and user computing device 114 is in accordance with the BLUETOOTH low energy standard, although other suitable data communication protocols can also be used as would be understood in the art. In an embodiment, the user computing devices 114 also can communicate with the MFP 104 using the network 102.

Figure 2:
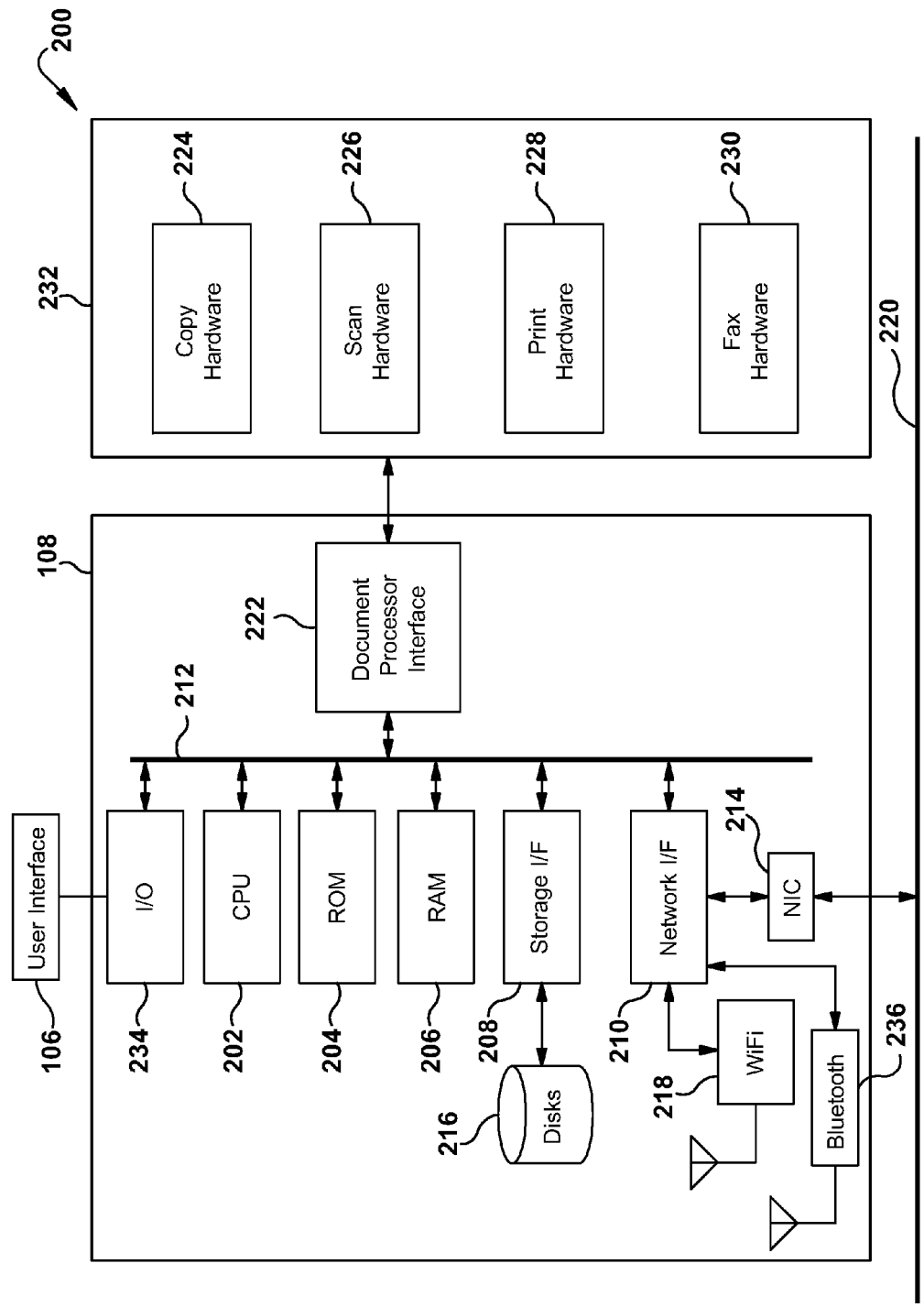
FIG. 2 is a block diagram of components of a multifunction peripheral according to an embodiment of the disclosure.

Turning now to FIG. 2, presented are functional components 200 suitably comprising a multifunctional peripheral such as the MFP 104 of FIG. 1. Included is an example embodiment of controller 108 which is suitably comprised of a computer. Included in the example controller 108 are one or more processors, such as are illustrated by central processor unit (CPU) 202. Also included are non-volatile memories, such as read-only memory (ROM) 204, random access memory (RAM) 206, a storage interface 208, a network interface 210, and I/O interface 234. In the example embodiment, CPU 202, ROM 204, RAM 206, storage interface 208, network interface 210, and I/O interface 234 are in mutual data communication via bus 212. Storage interface 208 facilitates data access with bulk data storage, such as one or more disks 216, or any other suitable data storage such as a flash drive, solid state storage drive, CD, DVD or the like.

Network interface 210 suitably provides for external data communication, such as with a network interface connection (NIC) 214, WiFi interface 218, or BLUETOOTH interface 236. NIC 214 or WiFi interface 218 suitably provide for connection to an associated network 220. BLUETOOTH interface 236 suitably provides for connection to user computing devices that are in proximity to the MFP 104 as described above for FIG. 1. A document processor interface 222 is also in data communication with bus 212, and provides a gateway to copy hardware 224, scan hardware 226, print hardware 228 and fax hardware 230 which together comprise MFP functional hardware 232.

In the example embodiment of FIG. 2, the input/output controller or I/O interface 234 suitably provides support for the user interface 106 and can include support for a display screen, touchscreen inputs, key inputs such as keypad or keyboard inputs, audible outputs such as a speaker, and so forth. I/O interface 234 can support standardized inputs and outputs, such as VGA, HDMI, USB, and serial interfaces, or can be configured to support proprietary cabling and/or proprietary interfaces. When a user computing device 114 is in proximity of the MFP 104, the MFP 104 can redirect the user interface operations to the user computing device 114 using the BLUETOOTH interface 236.

Figure 3:
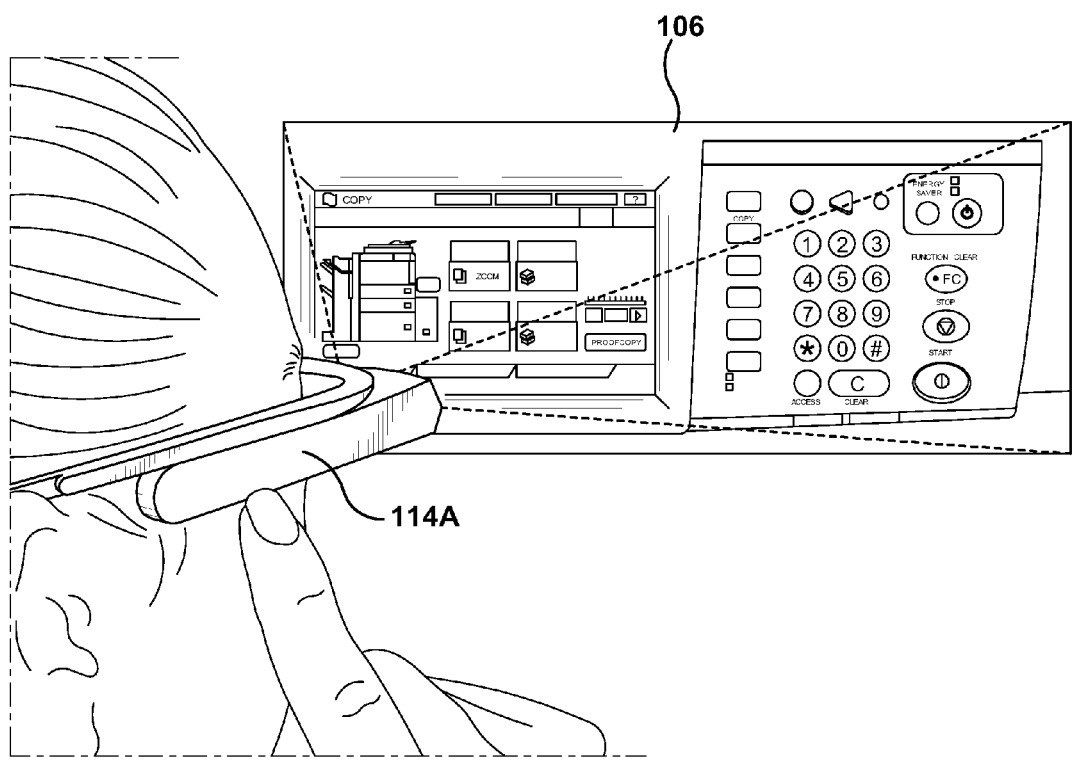
FIG. 3 is a system overview diagram of a multifunction peripheral that includes a proximity-based user interface system according to an embodiment of the disclosure.

Turning now to FIG. 3, a system overview diagram is presented. In the system over diagram, a user computing device 114, such as the heads up display 114A of FIG. 1, is in proximity of the MFP. The user interface 106 of the MFP is presented on the heads up display 114A and the user can interact with the MFP as if the user is at the front display panel of the MFP. In a configuration, the user interface 106 that is presented on the heads up display 114A is substantially identical in terms of look and functionality as the front display panel of the MFP. In a configuration, the user interface 106 can be suitably customized for the particular type of user computing device 114. In this configuration, the user can customize the user interface without affecting other users of the same MFPs. In a configuration, the user can choose an authentication method available with the user computing device 114, such as a biometric authentication method.

In various embodiments, the user computing device 114 optionally can be presented with other information other than the user interface of the MFP. For example, if the MFP or user computing device 114 determines that the user computing device 114 is at threshold distance from the MFP, for example 10 meters away or more, then the user computing device 114 can present the user with information for locating the MFP, for example by displaying a map or directions to the MFP. In another example, if the MFP or user computing device 114 determines that the user computer device 114 is below the threshold distance, but not immediately proximate to the MFP, for example less than 10 meters away but more than about a meter away, then the user computing device 114 can present the user with information about services available on the MFP. When the user computing device 114 is determined to move within a meter or less of the MFP, for example a few centimeters, then the user interface can be transferred to the user computing device 114. Different threshold distances can be used as would be understood by one of skill in the art. In a configuration, when the user interface is transferred to the user computing device 114, then the display of the MFP can be disabled or blanked. In a configuration, the display of the MFP can optionally remain active to allow the user to simultaneously use the display of the MFP as well as the user computing device 114 for performing operations on the MFP.

In an embodiment, the MFP can use BLUETOOTH low energy proximity sensing. The MFP can broadcast a UUID, or universally unique identifier, to a nearby user computing device 114. Based on communications between the MFP and the user computing device, the MFP can determine if the user has entered, exited, or lingered in proximity to the MFP. In an embodiment, the MFP can determine the distance to the user via a sensor (not shown), for example a camera sensor, an ultrasonic sensor, near field communications, and other sensors and sensing technologies as would be understood in the art.

In an embodiment, the MFP can determine the identity of the user from received document properties of a print job and/or the user computing device. Identifying information can be used to set the default language, determine which print jobs to display to the user on the user computing device, and other tasks as would be understood by one of ordinary skill in the art.

Figure 4:
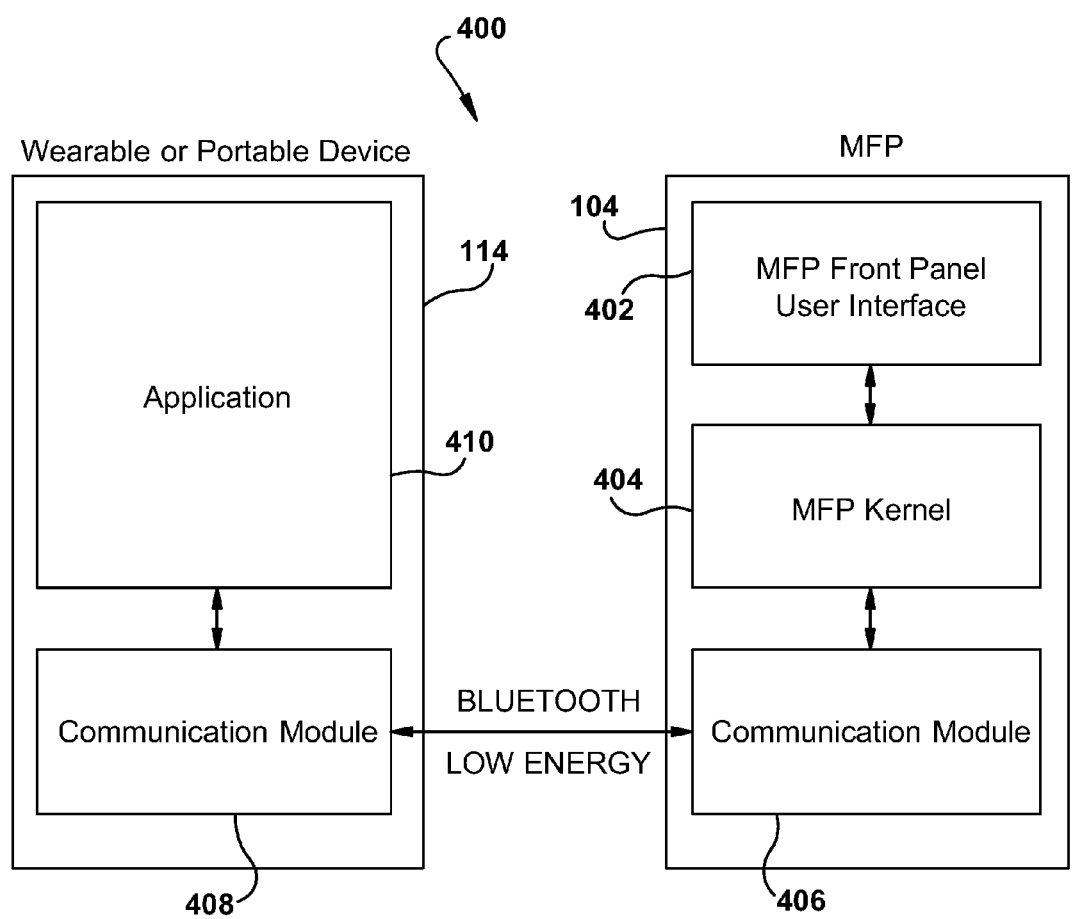
FIG. 4 is a system diagram of software components of a proximity-based user interface system.

Referring now also to FIG. 4, presented are example software modules blocks for a user computing device 114 and an MFP 104 with a proximity-based user interface system 400. In the MFP 104, the Front Panel User Interface module 402 generates the user interface that is presented to the user on the front panel display and on the user computing device. When the user computing device 114 is in close proximity to the MFP 104, the user interface is transferred by the MFP Kernel module 404 to the Communications Module 406. The Communications Module 406 provides the stack for supporting BLUETOOTH low energy communications with user computing devices 114. For example, the Communications Module 406 can broadcast a universally unique identifier, receive a response from a user computing device 114, determine the RSSI of the received response, approximate the distance to the user computing device 114, and packetize user interface data and other information that are wirelessly transmitted to the user computing device 114.

In the user computing device 114, a similar Communications Module 408 provides the stack for supporting BLUETOOTH low energy communications with the MFP 104 and other BLUETOOTH devices. The Communications Module 408 can determine the approximate distance to the MFP 104. The Communications Modules 408 depacketizes the BLUETOOTH low energy communications received from the MFP 104 and passes the user interface data and other information to the Application Module 410. The user interface data and other information also can be suitably packetized, for example using any of the TCP/IP family of protocols.

An Application, or Application Module 410, executes on the user computing device and receives the user interface data and other information from the Communications Module 408, for example as TCP/IP packets. The Application Module 410 presents the user interface to the user in a format suitable for the particular kind of user computing device 114, for example by formatting the user interface into a format suitable for presentation on the display element of the user computing device 114. In a configuration, user profiles and configuration information in the user computing device 114 is used to format the user interface, for example by selecting the particular language used in the user interface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing system, comprising:
   an embedded controller including a processor, a memory in data communication with the processor, and a network interface in communication with the processor, the memory operable for storage of data and instructions, and the network interface configured for data communication with a user computing device;
the network interface configured to receive user interface data corresponding to generation of a document processing system user interface from the embedded controller;
wherein the embedded controller is configured to determine if the user computing device is in proximity to the document processing system and selectively send device location data and the user interface data to the user computing device via the network interface based at least in part on the proximity of the user computing device to the document processing system, wherein the device location data is sent when the user computing device is at a relatively greater distance to the document processing system and the user interface data is sent when the user computing device is at a relatively smaller distance to the document processing system;
wherein the embedded controller is configured to wirelessly receive a document processing instruction from the user computing device;
wherein the embedded controller is configured to commence a document processing operation in accordance with a received document processing instruction; and
wherein one or more of the embedded controller or the user computing device is configured to use a customized user interface without affecting the user interface on a front panel display of the document processing system.

2. The document processing system of claim 1, wherein the embedded controller is further configured to
transmit a universally unique identifier via the network interface,
receive a communication from the user computing device in response to the transmitted universally unique identifier,
determine a received signal strength indication of the communication received from the user computing device, and
determine an approximate distance to the user computing device based at least in part on the received signal strength indication.

3. The document processing system of claim 1, wherein the network interface is a BLUETOOTH low energy network interface.

4. The document processing system of claim 1, wherein user computing device is selected from the group consisting of mobile computing device, a mobile phone, a smart phone, a pad-based computing device, a laptop, a heads up display device, a head mounted display device, a glasses-based computing device, and a smart watch.

5. The document processing system of claim 1, wherein the embedded controller is further configured to cease sending user interface data to the user computing device based at least in part on an increase in distance between the user computing device and the document processing system.

6. The document processing system of claim 1, wherein when the user computing device and the document processing system are within a threshold distance, one or more of the embedded controller or the user computing device is further configured to provide, on the user computing device, direction information to the document processing system.

7. The document processing system of claim 6, wherein the embedded controller is further configured to send service information about the document processing system to the user computing device based on an decrease in distance between the user computing device and the document processing system.

8. The document processing system of claim 7, wherein the embedded controller is configured to receive a user selection from the user computing device to set the language for the user interface without affecting the language used on a front panel display of the document processing system.

9. The document processing system of claim 1, further comprising:
a sensor in communication with the embedded controller that is configured to sense the distance between the user computing device and the document processing system.

10. A method for generating device location information and a user interface from a document processing device for display on a portable data device comprising:
sensing if a mobile computing device is in proximity to a document processing device in accordance with a measured signal strength corresponding to a data communication channel established via a wireless data interface between the document processing device and the portable data device; and
selectively sending device location data corresponding to and location of the document processing device and user interface data corresponding to generation of a document processing system user interface to the mobile computing device via the wireless data interface to display a location of the document processing device on the mobile computing device when the portable data device is at a relatively greater distance to the document processing device and to display a user interface for operating the document processing device on the mobile computing device when the mobile computing device is at a relatively smaller distance to the document processing device;
wherein the user interface data is selectively sent based at least in part on the proximity of the mobile computing device to the document processing system;
receiving a document processing instruction from the mobile computing device via the wireless data interface;
commencing a document processing operation in accordance with a received document processing instruction; and
presenting a customized user interface on the mobile computing device without affecting the user interface on a front panel display of the document processing device.

11. The method of claim 10, further comprising:
transmitting at least a universally unique identifier from a BLUETOOTH low energy interface of the document processing device;
receiving, in response to the transmitting operation, a response from the mobile computing device;
determining the received signal strength indication of the received response;
approximating a distance to the mobile computing device based at least in part on the received signal strength indication.

12. The method of claim 11, further comprising:
determining an increase in the distance between the document processing device and the mobile computing device; and
ceasing sending the user interface data based at least in part on the increase in distance.

13. The method of claim 11, further comprising:
determining that the mobile computing device is within a threshold distance of the document processing device; and
providing, on the user computing device, one or more of
directional information to the document processing system, or
service related information about the document processing device.

14. The method of claim 10, wherein the mobile computing device is selected from the group consisting of a mobile phone, a smart phone, a pad-based computing device, a laptop, a heads up display device, a head mounted display device, a glasses-based computing device, and a smart watch.

15. The method of claim 10, further comprising:
receiving a user selection of a language to use on the user interface on the mobile computing device without affecting the language used on a front panel display of the document processing device.

16. A document processing device, comprising:
a printer configured to print documents received from a user;
a network interface configured to transmit and receive BLUETOOTH low energy communications with a mobile computing device of the user and determine a received signal strength indication of a received BLUETOOTH low energy communication;
a display configured to display a user interface for controlling the document processing device by the user;
a processor configured to selectively send device location data, corresponding to generation of a location of the document processing device on a display on the mobile computing device, and user interface data, corresponding to generation of the user interface on the display on the mobile computing device, via the network interface based at least in part on the received signal strength indication such that the device location data is sent when the mobile computing device is at a relatively greater distance from the document processing device and the user interface data is sent when the mobile computing device is a relatively smaller distance from the document processing device;
wherein the processor is configured to wirelessly receive a document processing instruction from the user computing device; and
wherein the processor is configured to commence a document processing operation in accordance with a received document processing instruction.

17. The document processing device of claim 16, wherein the processor is further configured to send, to the mobile computing device, one or more of
directional information to the document processing system, or
service related information about the document processing device,
when the mobile computing device is within a threshold distance of the document processing device based at least in part on the received signal strength indication.

18. The document processing device of claim 16, wherein the processor is further configured to send user interface data to the mobile computing device that includes one or more of a different language than used on the display or a customized user interface, without affecting either the language or the look and feel of the user interface used on the display.

* * * * *